No. 654,569. Patented July 24, 1900.
T. J. HOGAN.
FLUID PRESSURE REGULATING DEVICE.
(Application filed May 8, 1900.)
(No Model.) 2 Sheets—Sheet 1.
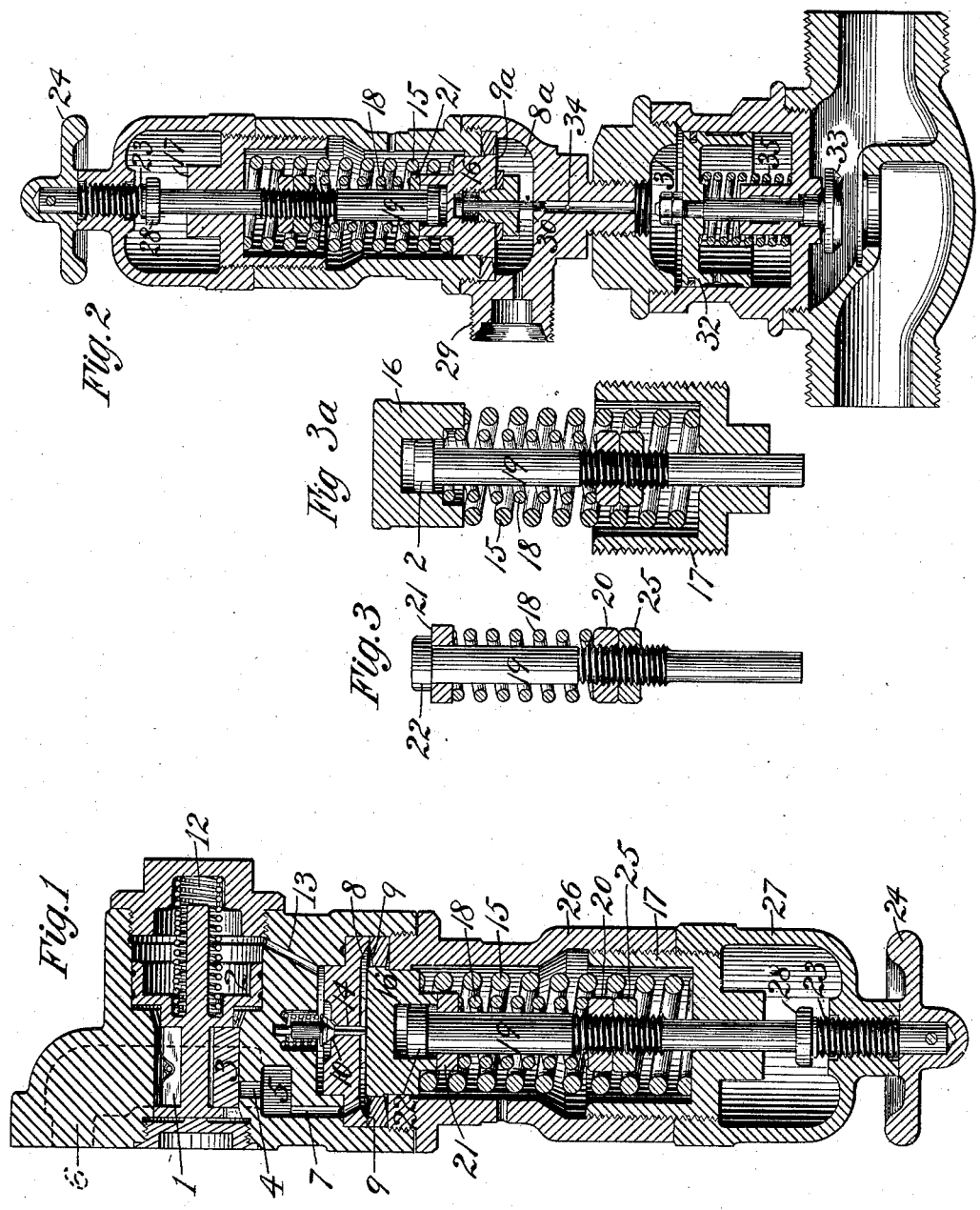
WITNESSES:
INVENTOR,
Thomas J. Hogan.

No. 654,569. Patented July 24, 1900.
T. J. HOGAN.
FLUID PRESSURE REGULATING DEVICE.
(Application filed May 8, 1900.)
(No Model.) 2 Sheets—Sheet 2.
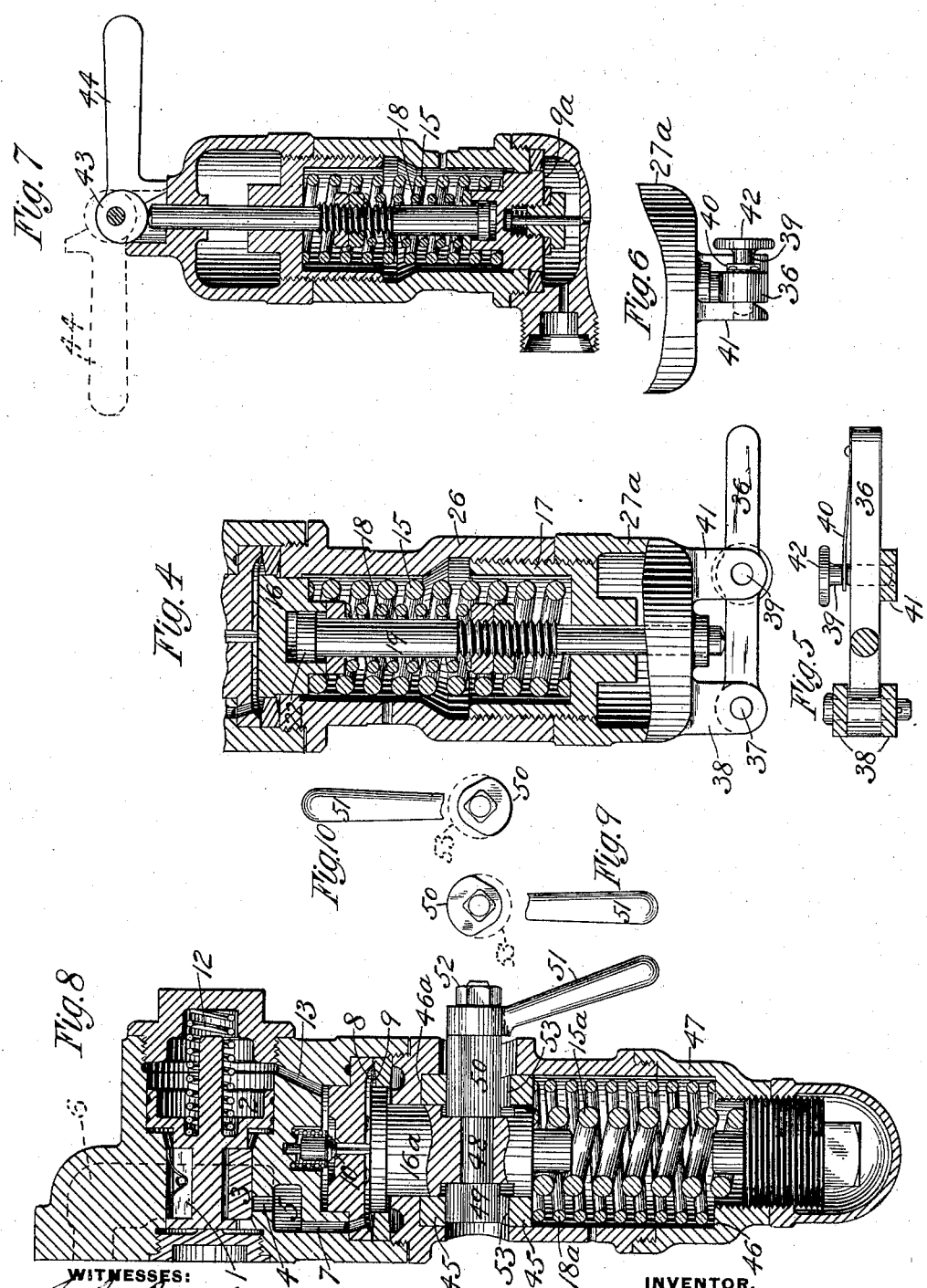
WITNESSES: INVENTOR,
Thomas J. Hogan.

UNITED STATES PATENT OFFICE.

THOMAS J. HOGAN, OF PITTSBURG, PENNSYLVANIA, ASSIGNOR TO THE WESTINGHOUSE AIR BRAKE COMPANY, OF SAME PLACE.

FLUID-PRESSURE-REGULATING DEVICE.

SPECIFICATION forming part of Letters Patent No. 654,569, dated July 24, 1900.

Application filed May 8, 1900. Serial No. 15,975. (No model.)

*To all whom it may concern:*

Be it known that I, THOMAS J. HOGAN, a citizen of the United States, residing at Pittsburg, county of Allegheny, State of Pennsylvania, have invented or discovered a certain new and useful Improvement in Fluid-Pressure-Regulating Devices, of which improvement the following is a specification.

The object of my invention is to provide an improvement in fluid-pressure-regulating devices; and to this end it consists in new and improved means for varying the capability of such regulating devices, whereby the limits of pressure necessary to effect or permit the operation of a valve or similarly-operative governing device may be conveniently and quickly varied at will.

In the accompanying drawings, which illustrate applications of my invention, Figure 1 is a central section through an automatic feed-valve device, and Fig. 2 a similar section through a pump-governor with my improvement applied thereto; Fig. 3, a view, partly in section and partly in elevation, showing a portion of the construction detached; Fig. 3ª, a modification in which the supplemental spring is employed without the sliding collar on the stem; Figs. 4, 5, and 6, views showing a modification of the means for throwing the supplemental spring into engagement as applied to the feed-valve device shown in Fig. 1; Fig. 7, a modification shown applied to the pump-governor; Fig. 8, a view of the feed-valve device similar to that shown in Fig. 1, but with a different means for bringing the supplemental spring into engagement; and Figs. 9 and 10, two views showing the cam device of Fig. 8 in end elevation in the two positions which it will occupy to engage or disengage the supplemental spring.

The feed-valve device and the pump-governor shown in the drawings and herein referred to are not of my invention and are shown merely to illustrate applications of my invention, which consists of the spring mechanism and its combination with such devices.

The feed-valve device shown in Fig. 1 of the drawings is specially intended for automatically controlling the supply of fluid under pressure to the train-pipe of an automatic fluid-pressure brake system; but its employment is not limited to that particular purpose. When employed in an automatic brake system, the function of the feed-valve device is to control the flow of fluid from the main reservoir to the train-pipe, so as to maintain a constant pressure in the train-pipe when the train is running and the brakes are off. Under ordinary circumstances the normal pressure in the train-pipe is usually seventy pounds and the pressure in the main reservoir ninety pounds; but for very high speeds it is found necessary to employ higher pressures, the train-pipe pressure being ninety pounds and the main-reservoir pressure one hundred and ten pounds. In order to permit of the employment of either of these pressures at will, locomotives have heretofore been equipped with duplicate feed-valve devices having cut-out cocks by means of which either of the valve devices might be cut out and the other adapted for different pressures and different limits of pressure in the train-pipe and main reservoir might be connected for operation. By means of my improvement a single feed-valve device may be employed instead of two, and the expense of manufacture and maintenance may be correspondingly reduced.

In devices of the kind to which my improvement is especially applicable a movable abutment, diaphragm, or piston is usually employed, which is operative on variations of fluid-pressure acting thereon, so as to actuate or permit the movement of a valve or some movable part of the regulating device—such, for example, as a switch or make-and-break device by which an electrically-operated device may be controlled. Whether the movable abutment be exposed on one or both sides to the action of the fluid under pressure it is common to employ a spring which acts on one side of the movable abutment in opposition to the pressure of a fluid acting on the other side, and the pressure of the spring must be carefully adjusted by the adjustment of a bearing or screw plug, which thereafter cannot be moved without affecting and rendering uncertain the pressure exerted by the spring, so that such regulating device is usually limited where certainty is desired to an adjustment for certain definite pressures and limits of pressure, and for other pressures and limits of pressure which it may be necessary to employ on short notice and which are to be quickly brought into action by the ordinary operator it is usual to employ one or more additional regulating devices, in which all of the mechanism is duplicated. By means of my improvement a multiplication of the valves and movable abutments is obviated, and these parts are adapted to be employed in a single device for operating under other pressures and limits of pressure by the provision of a supplemental spring and means by which it may be easily and quickly and with certainty brought into or thrown out of operative condition, so as to vary the spring resistance as desired.

The operation of my improvement may be understood without showing in detail all of the parts and connections of the different devices to which it may be applied, and I have therefore shown but a single view of the feed-valve device and of the pump-governor.

The feed-valve device shown in Fig. 1 of the drawings is usually so connected with the main reservoir of an air-brake system that the chamber 1 on the left of the movable piston or abutment 2 is in open communication with the main reservoir, and the slide-valve 3 controls the passage of fluid from the main reservoir to the train-pipe through the passages 4 and 5 (shown in full lines) and the passage 6. (Shown in dotted lines.) Through the passages 7, 5, and 6 the chamber 8 above the movable abutment or diaphragm 9 is at all times in communication with the train-pipe, so that when the train is running with the brakes off the normal train-pipe pressure acts on the upper side of the abutment 9 and tends to move it downward, so as to permit the seating of the small valve 10. When the small valve 10 is seated, fluid from the left of piston 2 leaks around that piston to the right and accumulating therein counterbalances the fluid-pressure on the left and permits the spring 12 to move piston 2 and slide valve 3 to the left, so as to close port 4 and cut off communication between the main reservoir and the train-pipe. Any reduction in the train-pipe pressure below the normal will then permit the spring-pressure acting below the diaphragm 9 to move the diaphragm 9 upward, so as to unseat the small valve 10 and permit the fluid under pressure on the right of the piston 2 to flow through the passages 13 14, chamber 8, and passages 7, 5, 4, and 6 to the train-pipe. The reduction of pressure thus effected on the right of the piston 2 will permit the main-reservoir pressure in chamber 1 to move the piston 2 and slide valve 3 to the right, so as to uncover the port 4 and open communication between the main reservoir and the train-pipe, and fluid under pressure will flow from the main reservoir to the train-pipe until the normal train-pipe pressure is reached, when the diaphragm 9 will be moved down and the valve 10 again seated.

Heretofore but a single spring 15, bearing at one end against a sliding block 16 and at the other end against a normally-fixed bearing 17, has been employed for each feed-valve device, and the normal train-pipe pressure to be employed and which acts on the diaphragm 9 has been limited to a certain maximum and minimum corresponding to a certain fixed adjustment of the spring. As shown in Fig. 1, in accordance with my invention and to render unnecessary the employment of more than one feed-valve device I employ in addition to the spring 15 another spring 18, mounted on a rod or stem 19, with one end bearing on an adjustable nut 20 and the other end bearing on a sliding collar 21. The head 22 of the stem 19 is fitted in a cylindrical recess in the block 16, so as to permit the block to move freely thereon, and the other end of the stem passes through the screw-threaded plug 17 and is adapted to be engaged by one end of screw 23, on the other end of which is mounted a small hand-wheel 24 for turning the screw. The parts may be assembled by placing the spring 18 on the stem 19, as shown in Fig. 3, and adjusting the spring as desired by means of the nuts 20 and 25 and then placing both springs 15 and 18 and the stem 19 in the casing 26, as shown, and adjusting the screw-plug 17 to give the proper tension to the spring 15. The cap 27 may then be screwed on, and if the parts are to be adjusted for the higher train-pipe pressure of, say, ninety pounds the handle 24 of the screw 23 should be turned until it bears on the end of the cap 27. The inner end of the screw 23 pressing on the stem 19 will then through the spring 18 press the sliding collar 21 against the block 16. Any downward movement of the diaphragm 9 will then be resisted by the pressure of both of the springs 15 and 18. If it is desired to employ the lower train-pipe pressure of, say, seventy pounds, the handle 24 of the screw 23 should be turned back until the cap 28 of the screw 23 comes in contact, or nearly so, with the inner shoulder of the cap 27. The pressure of the sliding collar 21 on the sliding block 16 will then be relieved, and the stem 19 and spring 18 may drop down far enough to prevent the spring 18 from offering any resistance to movement of the diaphragm 9. If it be desired to again bring the spring 18 into action, so as to be able to employ the higher train-pipe pressure, all that it is necessary to do is to turn the handle 24, so as to bring the parts into the positions they occupy in Fig. 1 of the drawings.

In Fig. 2 of the drawings my improvement is shown applied to a pump-governor such as is employed in the Westinghouse automatic air-brake system for controlling the supply of steam to the steam-cylinder of an air-pumping engine in accordance with the pressure in the train-pipe or main air-reservoir. The chamber $8^a$ of the governor is connected, by means of the nozzle 29, with either the main reservoir or the train-pipe, whichever is to control the operation of the pump, and the valve 30 is operated by the variations in fluid-pressure acting on one side of the diaphragm $9^a$ and the pressure of one or both of the springs 15 or 18 acting on the other side. The means for varying the spring-pressure in order to vary the maximum and minimum pressures required to operate the diaphragm $9^a$ and valve 30 are in all respects the same as in Fig. 1. The governing of the steam-supply is effected by the opening and closing of the valve 30. When the pressure in the chamber $8^a$ becomes excessive or greater than the desired maximum, the diaphragm $9^a$ is moved, so as to open valve 30 and admit fluid under pressure from chamber $8^a$ into chamber 31 above the piston 32, so as to move the valve 33 down to its seat, and thereby to cut off the supply of steam to the steam-cylinder of the pumping-engine. When the pressure in the chamber $8^a$ falls below a certain amount, the spring-pressure above diaphragm $9^a$ moves the diaphragm, so as to close the valve 30, and the leakage of fluid from chamber 31 through the small passage 34 permits the spring 35 to open valve 33 and start the pump. Either or both of the springs 15 18 may be employed in the pump-governing device, as in the feed-valve device, and the spring 18 is brought into operative engagement or released therefrom in exactly the same manner as in the feed-valve device shown in Fig. 1.

In Figs. 4, 5, and 6 of the drawings I have shown means by which the supplemental spring may be brought into engagement or released therefrom by a single movement of a latching-lever 36. The parts within the casing are in all respects the same as in Fig. 1, except that the stem 19 extends through and outside of the cap $27^a$ in order that it may be engaged by the lever 36, which is pivoted at 37 between the lugs 38, which are formed on the cap $27^a$. A small bolt 39 is fitted in a hole in the lever 36 and extends through it into a hole in the lug 41 when the lever is in the position shown in the drawings, the bolt being held in place by a flat spring 40. When it is desired to release the spring, the bolt 39 is withdrawn by taking hold of the head 42, and the lever 36 is allowed to hang down. The stem 19 will then move downward, and the pressure of the spring 18 against the block 16 will be relieved. In order to put the spring 18 into engagement with the block 16, whereby a higher fluid-pressure on the diaphragm may be employed, all that is necessary is to pull the lever 36 upward by a single movement until it is in the latched position shown in the drawings.

In Fig. 7 of the drawings I have shown a construction applied to the pump-governor by which the engagement and release of the supplemental spring 18 may be quickly and easily effected by turning the handle 44, so as to bring the cam 43 into engagement with the stem 19, as shown in the drawings, or to disengage the cam by turning the handle to the position shown by dotted lines.

In Fig. 8 of the drawings I have shown another form of my invention applied to a feed-valve device similar to that shown in Fig. 1 of the drawings, the only difference being in the spring mechanism. The sliding block $16^a$ is surrounded by a collar 45, which is fitted to slide in the casing, and the supplemental spring $18^a$ bears at one end against this collar and at its other end against a shoulder 46, formed on the part 47 of the casing, so that the spring $18^a$ tends to keep the upper edge of the collar in contact with the shoulder $46^a$ on the casing. The other spring $15^a$ at all times exerts a pressure against the sliding block $16^a$ and in opposition to the fluid-pressure acting on the upper side of the diaphragm 9. A stem or small shaft 48 is fitted to turn in the sliding block $16^a$ and is provided with the cams 49 and 50, the form of which is shown in end elevation in Figs. 9 and 10. On the end of the shaft 48 is secured a handle 51 for turning the shaft and cams. The cam 49 may be rigidly fixed to or formed integral with the shaft 48 and the cam 50 fitted on a squared portion of the shaft, so that it is removable when the nut 52 and the handle 51 are removed. When the supplemental spring $18^a$ is not being employed, the cams will be in the position shown in Figs. 8 and 9 until fluid-pressure is applied to the diaphragm 9 and may move downward with the block $16^a$ under the action of the fluid-pressure on the diaphragm 9 without moving or exerting any downward pressure on the collar 45 or spring $18^a$, the distance from the lower edge of the cams to the lower surface of the openings 53 being greater than the movement of the diaphragm, sliding block, and cams. When it is desired to employ a higher pressure on the diaphragm and on that account to utilize the resistance of the supplemental spring $18^a$, the handle 51 is turned to the position shown in Fig. 10, which reverses the position of the cams and causes them to make contact with the lower surface of the openings 53, the greatest radius of the cams being equal to the radius of the circular openings 53. If the movement of the handle to the position shown in Fig. 10 be made while no fluid-pressure is acting on the diaphragm, the broad portion of the cams, which is of the same curvature and concentric with the openings 53, will merely slide around on the inner surface of the openings 53 without moving the collar 45; but if the movement of the cams to the position shown in Fig. 10 be made while there is fluid-pressure acting on the diaphragm the eccentricity of the cams relative to the openings 53 will cause the cams to move the collar 45 downward out of contact with the shoulder 46ª. The reversal of the cams from the position shown in Figs. 8 and 9 to the position shown in Fig. 10 by making contact between the cams and the lower part of the openings 53 puts the spring 18ª in operative engagement, so that its resistance will be added to that of spring 15ª in opposition to the fluid-pressure acting on the diaphragm 9, and in order to withdraw this resistance the cams should be turned to the position shown in Figs. 8 and 9, when the spring 18ª will again press the collar 45 against the shoulder 46ª, but will exert no resistance in opposition to the fluid-pressure acting on the diaphragm.

In Fig. 3ª of the drawings I have shown a modification in which the sliding collar 21 is omitted and the supplemental spring 18 bears directly on the block or projection 16 of the movable abutment. In case this construction is employed the spring 18 may be of such a length that it will be entirely relieved of pressure when the operating-handle is moved to decrease the spring-pressure, or it may continue to bear against the block 16 with a slight predetermined pressure.

It will be seen that my invention provides simple and comparatively-inexpensive means whereby the change of resistance by the engagement or disengagement of a supplemental spring may be easily and quickly effected without uncertainty or danger of undesirable variation and that it is applicable to a great variety of fluid-pressure-regulating devices.

Each of the springs 15 and 18 may be separately adjusted for whatever pressure they are intended to exert, the spring 15 by means of the screw-plug 17 and the spring 18 by means of the nuts on the stem 19 when the constructions shown in Figs. 1 to 7 are employed, and in the construction shown in Fig. 8 the spring 18 may be adjusted to the desired tension by means of the adjustability of the part 47. It will be seen, therefore, that my invention provides means whereby either or both of two separately-adjusted springs may be employed at will to resist the action of the fluid-pressure on the diaphragm.

I claim as my invention and desire to secure by Letters Patent—

1. The combination, in a fluid-pressure-regulating device, of a movable abutment adapted to be operated by fluid under pressure, a spring opposing the action of the fluid under pressure on the abutment, and a supplemental spring adapted to be applied to increase the resistance to the action of the fluid under pressure, at any position of the movable abutment.

2. The combination, in a fluid-pressure-regulating device, of a movable abutment adapted to be operated by fluid under pressure, a spring opposing the action of the fluid under pressure on the abutment, and a supplemental spring adapted to be operatively engaged to resist the action of the fluid under pressure or to be quickly disengaged so as to offer no resistance to the action of the fluid under pressure.

3. The combination, in a fluid-pressure-regulating device, of a movable abutment adapted to be operated by fluid under pressure, a spring for opposing the action of the fluid under pressure on the abutment, a supplemental spring, and a lever or handle for putting the supplemental spring into or out of operative engagement with the abutment, whereby the resistance of one or both springs may be employed.

4. In a fluid-pressure-regulating device, a movable abutment adapted to be actuated by fluid under pressure, a spring permanently adjusted to resist the action of the fluid under pressure, and a supplemental spring adapted to be put into or out of operative engagement at any position of the abutment so as to vary the spring-pressure acting on the movable abutment.

5. The combination, in a fluid-pressure-regulating device, of a movable abutment adapted to be operated by fluid under pressure, a spring for opposing the action of fluid under pressure on the abutment, a supplemental spring, means for separately adjusting the springs, and a handle or lever for applying the supplemental spring so as to increase the resistance to movement of the abutment by the fluid under pressure.

6. The combination, in a fluid-pressure-regulating device, of a movable abutment exposed on one side to the action of fluid under pressure, a spring for overcoming a certain predetermined fluid-pressure on the abutment, a supplemental spring, means for separately adjusting the springs, and means for increasing the spring-pressure at any position of the abutment by the action of the supplemental spring, whereby the spring-pressure may be effective to overcome a greater fluid-pressure on the abutment.

7. In a fluid-pressure-regulating device, the combination, of a movable abutment adapted to be operated by fluid under pressure, a spring opposing the action of the fluid under pressure on the abutment, and a supplemental spring adapted to be operatively engaged at any position of the abutment to resist the action of the fluid under pressure.

8. In a fluid-pressure-regulating device, the combination, of a movable abutment adapted to be operated by fluid-pressure, a spring for opposing the action of the fluid under pressure, a supplemental spring for increasing the resistance to the fluid-pressure, a cam for throwing the supplemental spring into or out of action, and a handle or lever for operating the cam.

In testimony whereof I have hereunto set my hand.

THOMAS J. HOGAN.

Witnesses:
R. F. EMERY,
JAS. B. MACDONALD.